(12) United States Patent
Kuo

(10) Patent No.: US 12,494,820 B2
(45) Date of Patent: Dec. 9, 2025

(54) DIGITAL SIGNAL CODING AND DECODING METHOD, DIGITAL BROADCASTING SYSTEM AND DIGITAL TELEPHONE EXCHANGE SYSTEM

(71) Applicant: ALLWIN Network CO., LTD, New Taipei (TW)

(72) Inventor: Wu-Hsun Kuo, New Taipei (TW)

(73) Assignee: ALLWIN NETWORK CO., LTD, New Taipei (TW)

( * ) Notice: Subject to any disclaimer, the term of this patent is extended or adjusted under 35 U.S.C. 154(b) by 118 days.

(21) Appl. No.: 18/545,258

(22) Filed: Dec. 19, 2023

(65) Prior Publication Data

US 2024/0214031 A1 Jun. 27, 2024

(30) Foreign Application Priority Data

Dec. 21, 2022 (TW) .................................. 111149094

(51) Int. Cl.
*H04B 3/54* (2006.01)
*H04L 25/02* (2006.01)
*H04L 25/49* (2006.01)

(52) U.S. Cl.
CPC ............. *H04B 3/542* (2013.01); *H04B 3/548* (2013.01); *H04L 25/0272* (2013.01); *H04L 25/4917* (2013.01)

(58) Field of Classification Search
CPC .......... H04B 3/54; H04B 3/542; H04B 3/548; H04L 25/0272; H04L 25/4917; H04J 3/0658; H04J 3/06
See application file for complete search history.

(56) References Cited

U.S. PATENT DOCUMENTS

| | | | | |
|---|---|---|---|---|
| 6,141,032 | A * | 10/2000 | Priest | H04N 7/148 348/E7.051 |
| 6,343,126 | B1 * | 1/2002 | Stelman | H04M 3/42314 379/93.05 |
| 7,535,957 | B2 | 5/2009 | Ozawa et al. | |
| 11,387,852 | B2 | 7/2022 | Banin et al. | |
| 2003/0128835 | A1 * | 7/2003 | Lee | H04Q 11/0471 379/387.01 |
| 2012/0185241 | A1 * | 7/2012 | Miyasaka | G10L 19/12 704/219 |
| 2018/0041833 | A1 | 2/2018 | Mackay et al. | |
| 2019/0207742 | A1 * | 7/2019 | Haroun | H03M 9/00 |

(Continued)

OTHER PUBLICATIONS

Taiwan Office Action dated Jul. 13, 2023, TW Application No. 111149094, 9 pages.

*Primary Examiner* — Aristocratis Fotakis
(74) *Attorney, Agent, or Firm* — Li & Cai Intellectual Property Office

(57) ABSTRACT

A digital signal coding and decoding method, a digital broadcasting system, and a digital telephone exchange system are provided. The digital signal coding and decoding method includes providing a direct current signal; and providing a first direction indication signal and a second direction indication signal on the direct current signal according to each digital signal, so as to generate a plurality of coded signals. The digital signals include a plurality of low level digital signals and a plurality of high level digital signals. The first direction indication signal and the second direction indication signal are signals in opposite directions.

4 Claims, 7 Drawing Sheets

(56) References Cited

U.S. PATENT DOCUMENTS

2020/0219522 A1 7/2020 Lesso et al.
2022/0053269 A1 2/2022 Price et al.
2023/0403091 A1* 12/2023 Butler ................... H04B 3/54

* cited by examiner

DIGITAL SIGNAL CODING AND DECODING METHOD, DIGITAL BROADCASTING SYSTEM AND DIGITAL TELEPHONE EXCHANGE SYSTEM

CROSS-REFERENCE TO RELATED PATENT APPLICATION

This application claims the benefit of priority to Taiwan Patent Application No. 1111149094, filed on Dec. 21, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a digital signal coding and decoding method, a digital broadcasting system, and a digital telephone exchange system, and more particularly to a digital signal coding and decoding method, a digital broadcasting system, and a digital telephone exchange system that are low-cost and simple.

BACKGROUND OF THE DISCLOSURE

It requires complex coding methods and complex circuits for conventional digital audio signal coding and decoding methods, as well as audio transmission systems, resulting in higher costs for circuits, manufacturing, or system configuration.

SUMMARY OF THE DISCLOSURE

In response to the above-referenced technical inadequacies, the present disclosure provides a digital signal coding and decoding method, which is configured for coding and decoding a plurality of digital signals. The digital signal coding and decoding method includes providing a direct current signal; and providing a first direction indication signal and a second direction indication signal on the direct current signal according to each digital signal, so as to generate a plurality of coded signals. The plurality of digital signals include a plurality of low level digital signals and a plurality of high level digital signals. The first direction indication signal and the second direction indication signal are signals in opposite directions.

In order to solve the above-mentioned problems, one of the technical aspects adopted by the present disclosure is to provide a digital telephone exchange system, which includes an exchange host including a plurality of transmitting end/receiving end circuits, and a plurality of receiving end circuits each connected to the exchange host correspondingly through a first connection wire and a second connection wire. The plurality of transmitting end/receiving end circuits are configured to respectively provide a plurality of coded signals to the plurality of receiving end circuits. The plurality of coded signals include a direct current signal, a plurality of first direction indication signals, and a plurality of second direction indication signals. The plurality of first direction indication signal and the plurality of second direction indication signals are provided on the direct current signal, and each of the plurality of first direction indication signals and each of the plurality of second direction indication signal are signals in opposite directions.

In order to solve the above-mentioned problems, another one of the technical aspects adopted by the present disclosure is to provide a digital broadcasting system, which includes a transmitting end circuit, a plurality of receiving end circuits, and a plurality of audio amplifier circuits. The plurality of receiving end circuits are connected to the transmitting end circuit correspondingly through a first connection wire and a second connection wire. The plurality of audio amplifier circuits are respectively connected to the plurality of receiving end circuits. The transmitting end circuit is configured to provide a plurality of coded signals including a direct current signal, a plurality of first direction indication signals, and a plurality of second direction indication signals. The plurality of first direction indication signals and the plurality of second direction indication signals are provided on the direct current signal, and each of the plurality of first direction indication signals and each of the plurality of second direction indication signal are signals in opposite directions.

Therefore, in the digital signal coding and decoding method, the digital broadcasting system, and the digital telephone exchange system provided by the present disclosure, a simple coding and decoding method can be utilized to reduce a circuit complexity of a two-wire signal transmission system and a difficulty of a control method, so as to effectively reduce costs for circuits and system configuration.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1A:
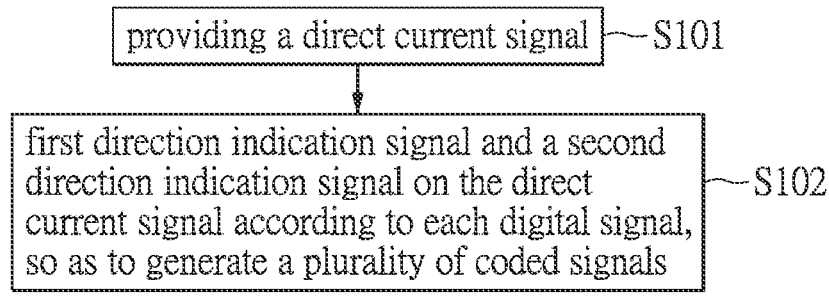
FIG. 1A is a schematic view showing a coding and decoding method according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 1B:
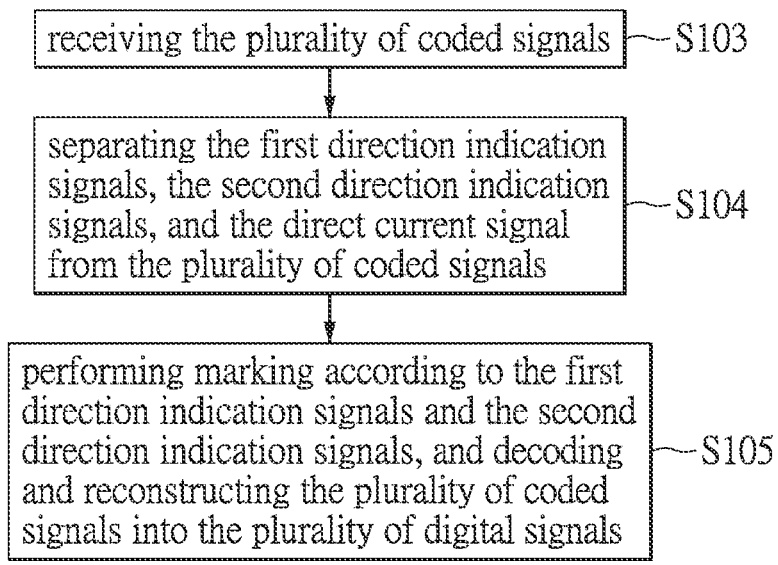
FIG. 1B is another schematic view showing the coding and decoding method according to the first embodiment of the present disclosure.
Figure 2:
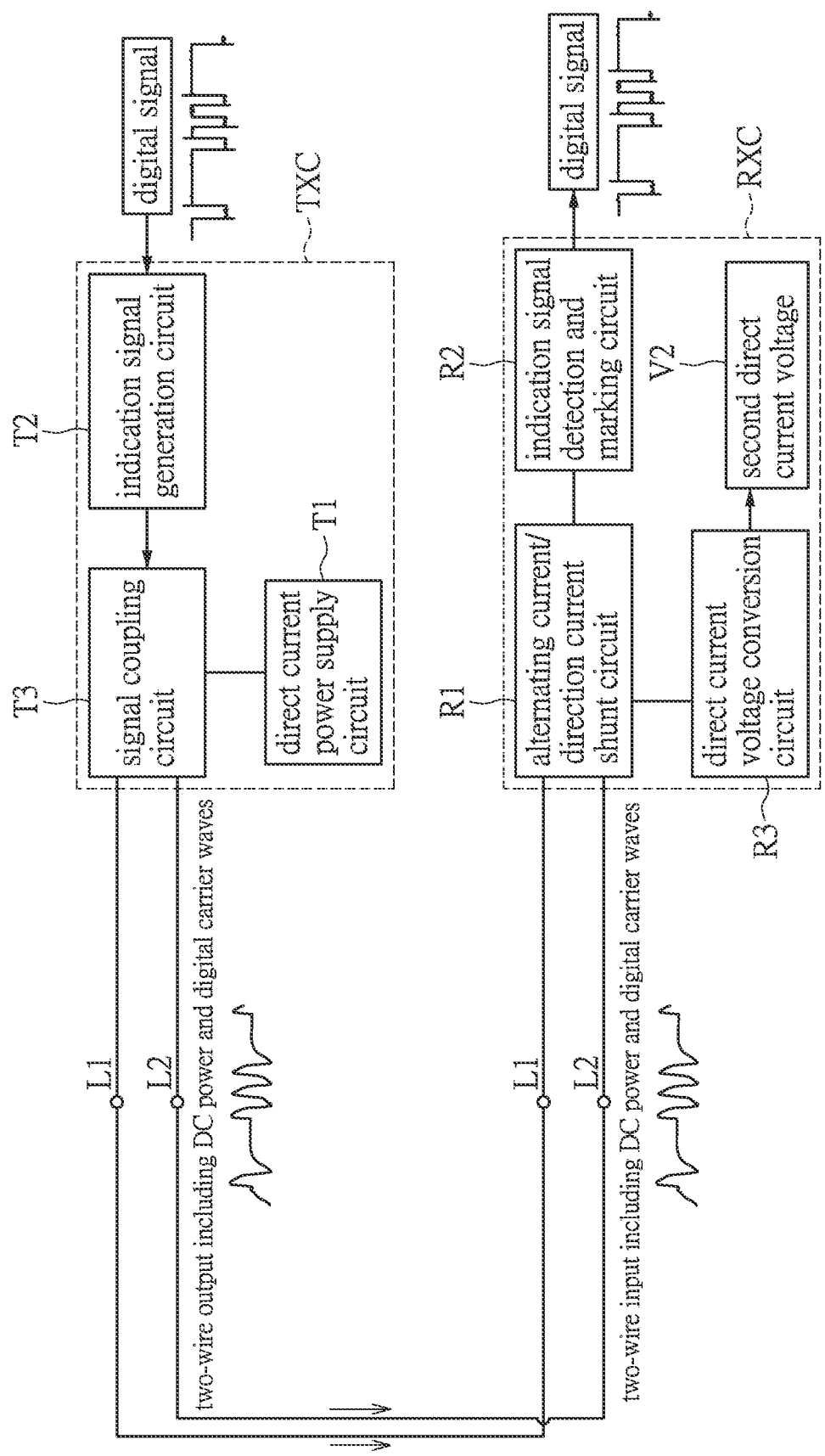
FIG. 2 is a schematic view of a transmitting end circuit and a receiving end circuit according to the first embodiment of the present disclosure.
Figure 3:
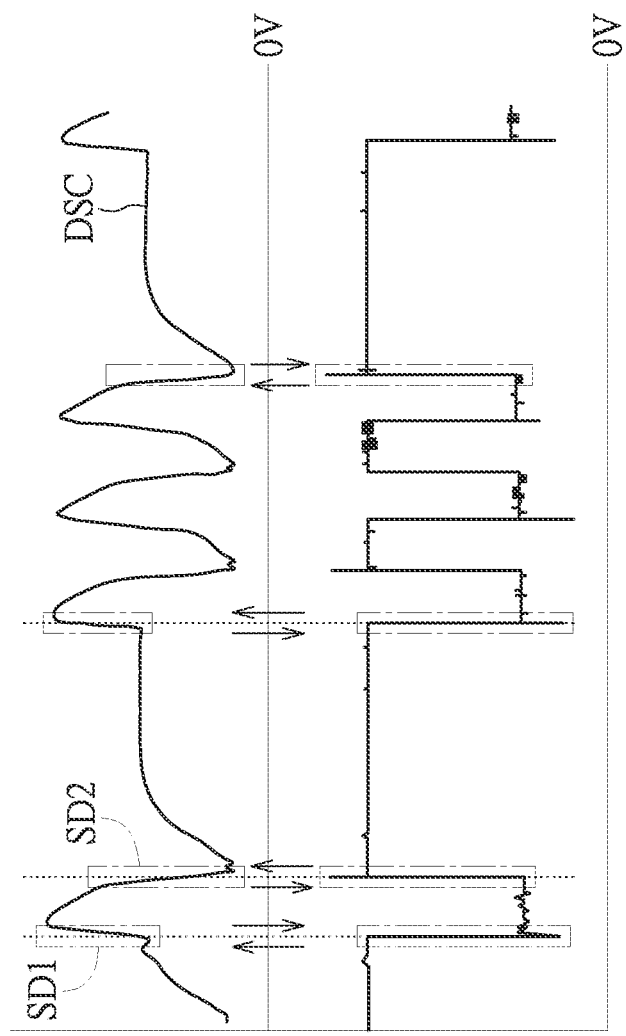
FIG. 3 is a schematic view showing a relationship between a digital signal, a direct current signal, a first direction indication signal, and a second direction indication signal according to the first embodiment of the present disclosure.
Figure 4:
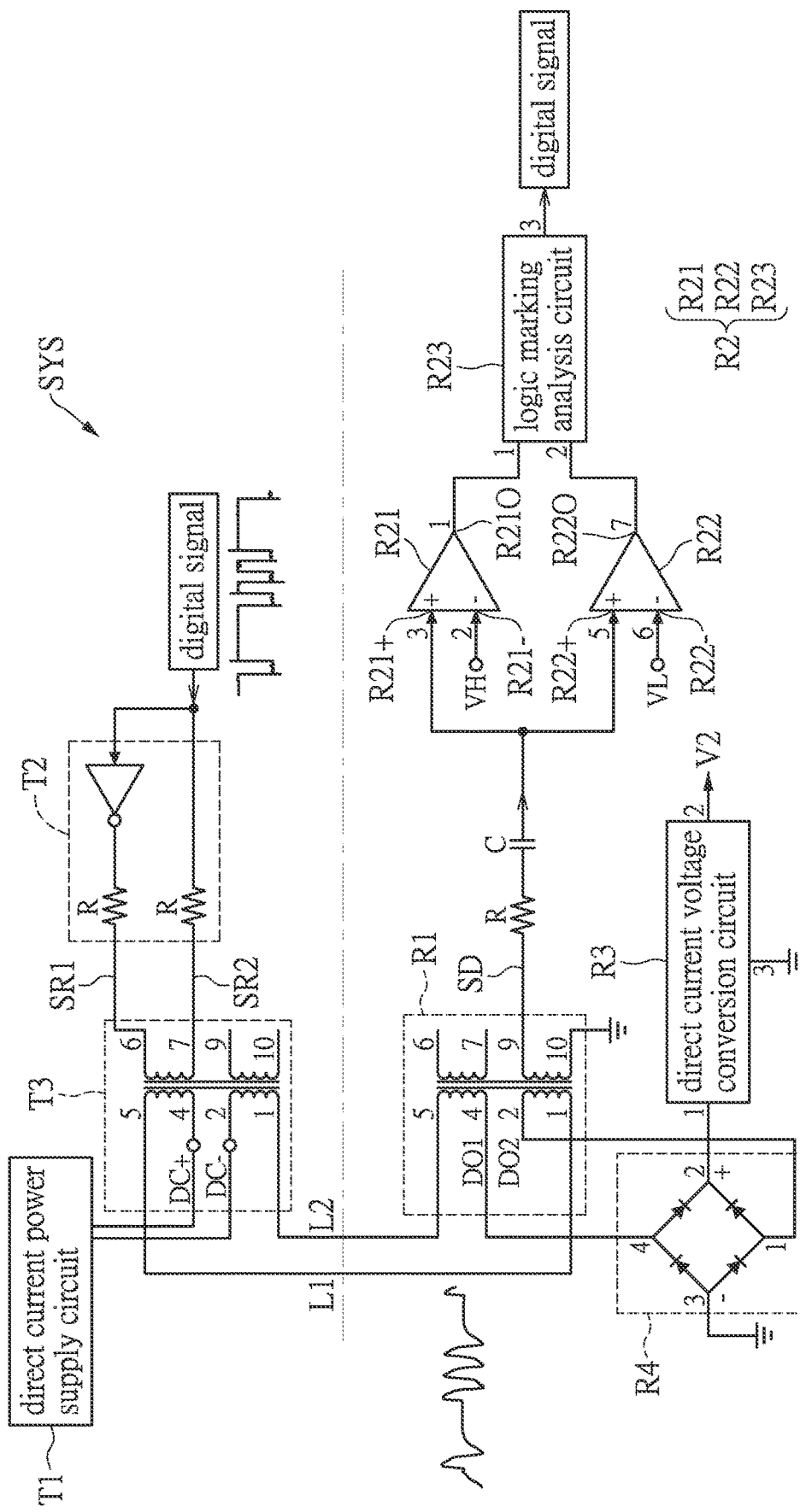
FIG. 4 is a schematic circuit diagram of the transmitting end circuit and the receiving end circuit of FIG. 2.

Reference is made to FIG. 1A, FIG. 1B, FIG. 2, FIG. 3 and FIG. 4, in which FIG. 1 is a schematic view showing a coding and decoding method according to a first embodiment of the present disclosure, FIG. 1B is another schematic view showing the coding and decoding method according to the first embodiment of the present disclosure, FIG. 2 is a schematic view of a transmitting end circuit and a receiving end circuit according to the first embodiment of the present disclosure, FIG. 3 is a schematic view showing a relationship between a digital signal, a direct current signal, a first direction indication signal, and a second direction indication signal according to the first embodiment of the present disclosure, and FIG. 4 is a schematic circuit diagram of the transmitting end circuit and the receiving end circuit of FIG. 2.

The present embodiment provides a digital signal coding and decoding method.

The digital signal coding and decoding method of the present embodiment is configured for coding and decoding a plurality of digital signals, and more particularly for long distance transmission of audio signals.

The coding method of the digital signal coding and decoding method includes the following steps.

Step S101: providing a direct-current signal; and

Step S102: providing a first direction indication signal and a second direction indication signal on the direct current signal according to each digital signal, so as to generate a plurality of coded signals.

The decoding method of the digital signal coding and decoding method includes the following steps.

Step S103: receiving the plurality of coded signals;

Step S104: separating the first direction indication signals, the second direction signals, and the direct-current signal from the plurality of coded signals; and Step S105: performing marking according to the first direction indication signals and the second direction signals, and decoding and reconstructing the plurality of coded signals into the plurality of digital signals.

In steps S101 and S102, each of the plurality of digital signals is a low level digital signal or a high level digital signal. That is, the plurality of digital signals are a combination of the high level digital signals and the low level digital signals.

The first direction indication signal SD1 and the second direction indication signal SD2 are signals in opposite directions. In the present embodiment, the first direction indication signal is an upward pulse signal with respect to the direct current signal DCS, and the second direction indication signal is a downward pulse signal with respect to the direct current signal DCS. That is, the first direction indication signal SD1 and the second direction indication signal SD2 are pulse signals in opposite directions. Reference is made to FIG. 3, in which the reference numeral SD1 indicates the first direction indication signal, the reference numeral SD2 indicates the second direction indication signal, and the direct current signal DCS is a direct current voltage. In the present embodiment, the direct current signal DCS, the first direction indication signal, and the second direction indication signal are combined into the coded signal for transmission. As shown in FIG. 2 and FIG. 4, the coded signal is correspondingly transmitted through a first connection wire L1 and a second connection wire L2. In the present embodiment, each of the first connection wire L1 and the second connection wire L2 is not limited to any type of wire, but can be a single-core wire, an electric wire, a telephone wire, or any other easily available wire, which is not limited in the present disclosure. In addition, lengths of the first connection wire L1 and the second connection wire L2 are not limited.

In the present embodiment, the first direction indication signal corresponds to a rising edge of the digital signal, i.e., the upward pulse signal with respect to the direct current signal DCS. The second direction indication signal corresponds to a falling edge of the digital signal, i.e., the downward pulse signal with respect to the direct current signal DCS. In other embodiments, the indication signals corresponding to the rising edge and the falling edge can be arranged in reverse, i.e., the second direction indication signal corresponds to the rising edge (i.e., the upward pulse signal with respect to the direct current signal DCS), and the first direction indication signal corresponds the falling edge (i.e., the downward pulse signal with respect to the direct current signal DCS).

In steps S103 and S104, the steps of decoding the coded signal are performed. The first step is to receive the coded signals, and then the direct current signal DCS, the first direction indication signals SD1, and the second direction indication signals SD2 are separated from the coded signals. A signal coupling circuit is required to combine the direct current signal DCS, the first direction indication signals SD1, and the second direction indication signals SD2 in step S102. In step S104, an alternating current/direct current shunt circuit is required.

In step S105, the marking is performed on the first direction indication signals and the second direction signals that are separated, and then the digital signals are reconstructed. As shown in FIG. 2 and FIG. 4, the first direction indication signals and the second direction signals are reconstructed to obtain the digital signals.

Generally, energy attenuation occurs when signals are transmitted over long distances. However, even if the first direction indication signal and the second direction indication signal of the present embodiment undergo a process of energy attenuation, the signals can be decoded as long as the first direction indication signal and the second direction indication signal can be recognized. Therefore, no errors or omissions in information transmission are caused by the energy attenuation.

In the present embodiment, the digital signal is an audio signal. The coding and decoding method of the present embodiment can also be applied to other digital signals, which is not limited in the present disclosure.

Referring to FIG. 2 and FIG. 4, the digital signal coding and decoding method of the present embodiment is configured for a coding and decoding circuit SYS. The coding and decoding circuit SYS includes a transmitting end circuit TXC and a receiving end circuit RXC. The transmitting end circuit TXC is connected to the receiving end circuit RXC correspondingly through the first connection wire L1 and the second connection wire L2.

The transmitting end circuit TXC includes a direct current power supply circuit T1, an indication signal generation circuit T2, and a signal coupling circuit T3.

The direct current power supply circuit T1 is configured to provide the direct current signal DCS.

The indication signal generation circuit T2 is configured to generate the first direction indication signal SD1 and the second direction indication signal SD2 according to each digital signal.

The signal coupling circuit T3 is correspondingly connected to the direct current power supply circuit T1 and the indication signal generation circuit T2, and configured to receive the direct current signal DCS provided by the direct current power supply circuit T1, and the first direction indication signals SD1 and the second direction indication signals SD2 generated by the indication signal generation circuit T2, and combines the direct current signal DCS, the first direction indication signals SD1 and the second direction indication signals SD2. In the present embodiment, the signal coupling circuit T3 is an inductor, and the first direction indication signals SD1 and the second direction indication signal SD2 are coupled to the direct current signal DCS provided by the direct current power supply circuit T1.

Referring to FIG. 4, the receiving end circuit RXC includes an alternating current/direction current shunt circuit R1, an indication signal detection and marking circuit R2, and a direct current voltage conversion circuit R3.

The alternating current/direct current shunt circuit R1 is correspondingly connected the first connection wire L1 and the second connection wire L2. After receiving the coded signals through the first connection wire L1 and the second connection wire L2, the alternating current/direct current shunt circuit R1 separates the first direction indication signals SD1, the second direction indication signals SD2 and the direct current signal DCS.

The indication signal detection and marking circuit R2 is electrically connected to the alternating current/direct current shunt circuit R1, and separates the first direction indication signals SD1 and the second direction indication signals SD2. Afterwards, the indication signal detection and marking circuit R2 detects and marks the first direction indication signals SD1 and the second direction indication signals SD2 that are then reconstructed into the digital signals.

The direct current voltage conversion circuit R3 is electrically connected to the alternating current/direct current shunt circuit R1 and configured to receive the direct current signal DCS that is separated, and convert the direct current signal DCS into a second direct current voltage.

In the present embodiment, a potential of the direct current signal DCS and a potential of the second direct current voltage can be the same or different. That is, the potential of the direct current signal DCS can be converted into a required voltage of the receiving end circuit RXC through the direct current voltage conversion circuit R3.

Referring to FIG. 4, the indication signal generation circuit T2 includes a phase inverter T21. The phase inverter T21 has an input end and an output end. The signal coupling circuit T3 has a first signal receiving end SR1 and a second signal receiving end SR2. The first signal receiving end SR1 is connected to the output end of the phase inverter T21. The input end of the phase inverter T21 is connected to the second signal receiving end SR2, and the input end of the phase inverter T21 and the second signal receiving end SR2 are configured to receive the digital signals. The indication signal generation circuit T2 can be connected a resistor R before being correspondingly connected to the first signal receiving end SR1 and the second signal receiving end SR2.

The signal coupling circuit T3 also has a direct current input positive end DC+ and a direct current input negative end DC−. The direct current input positive end DC+ and the direct current input negative end DC− are correspondingly connected to the direct current power supply circuit T1 to receive the direct current signal.

The alternating current/direct current shunt circuit R1 is a receiver inductor. The receiving end circuit RXC also includes a rectification circuit R4. The alternating current/direct current shunt circuit R1 has a first direct current output end DO1, a second direct current output end OD2, and a coded signal output end SO. The first direct current output end DO1 and the second direct current output end DO2 are correspondingly connected to the rectification circuit R4 to generate the second direct current voltage V2 through the rectification circuit R4. The coded signal output end SO is connected to the indication signal detection and marking circuit R2. In the present embodiment, the alternating current/direct current shunt circuit R1 and the signal coupling circuit T3 are configured in the form of inductors. However, in other embodiments, such configuration can be achieved using other circuit configuration, such as an adder circuit. In addition, in the present embodiment, the rectification circuit R4 can be a bridge rectifier, which can be adjusted according to user's practical requirements and is not limited in the present disclosure.

The indication signal detection and marking circuit R2 includes a first comparator R21, a second comparator R22, and a logic marking analysis circuit R23. The first comparator R21 has a first input positive end R21+, a second input negative end R21−, and a first output end R21O. The second comparator R22 has a third input positive end R22+, a fourth input negative end R22−, and a second output end R22O. The first input positive end R21+ of the first comparator R21 and the third input positive end R22+ of the second comparator R22 are correspondingly connected to the coded signal output end SO. The coded signal output end SO can be connected to a resistor-capacitor (RC) filter circuit before being connected to the indication signal detection and marking circuit R2. The resistor R and the capacitor C are connected to each other in series.

The second input negative end R21− is connected to a high level predetermined potential VH. The fourth input negative end R22− is connected a low level predetermined potential VL.

That is, the first direction indication signal SD1 and the second direction indication signal SD2 that are separated from the coded signals can be detected and marked through the high level predetermined potential VH and the low level predetermined potential VL. In the present embodiment, the first direction indication signal can be compared with the high level predetermined potential VH of the first comparator R21 and marked, and the second direction indication signal can be compared with the low level predetermined potential VH of the second comparator R22 and marked. The logic marking analysis circuit R23 is configured to output the digital signals that are reconstructed according to the first direction indication signal SD1 and the second direction indication signal SD2 that are detected.

Second Embodiment

Figure 5:
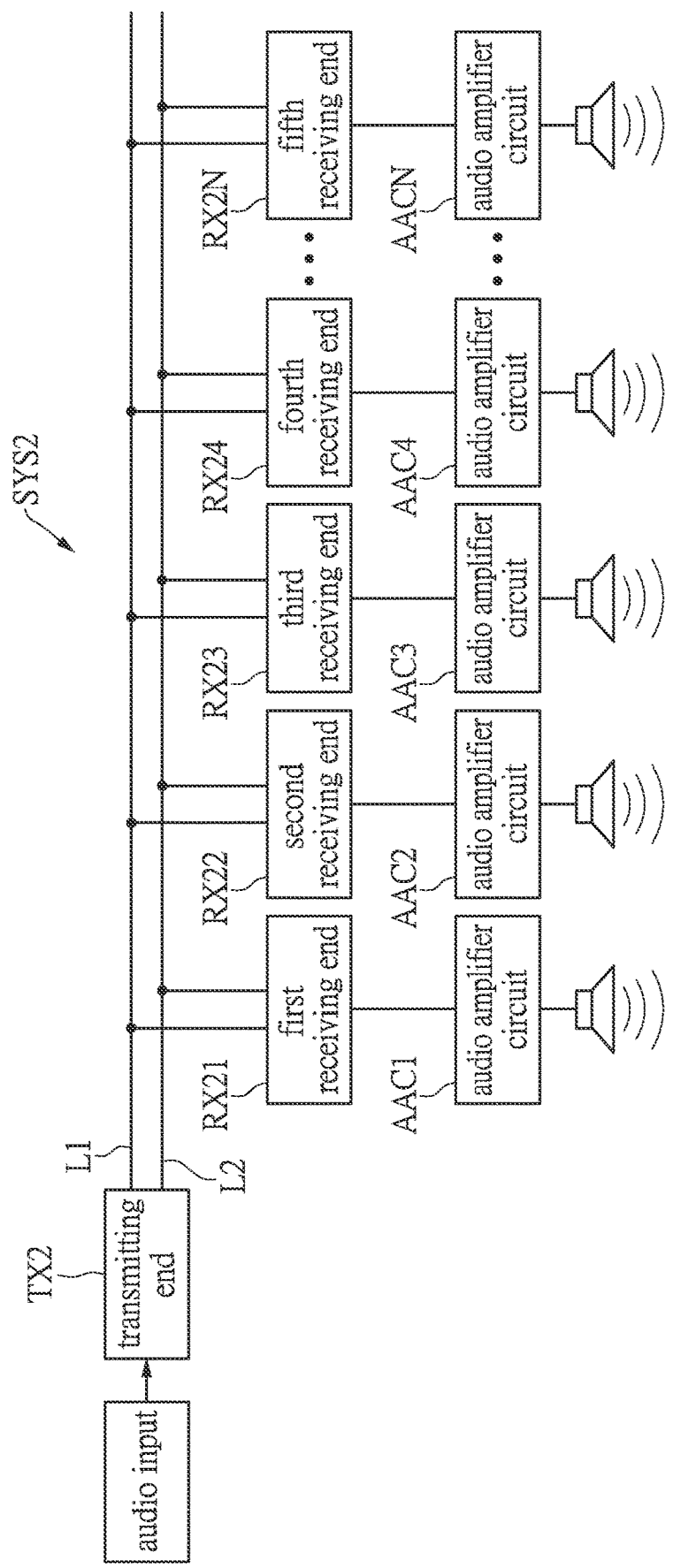
FIG. 5 is a schematic view of a digital broadcasting system according to a second embodiment of the present disclosure.

Reference is made to FIG. 5, in which a schematic view of a digital broadcasting system according to a second embodiment of the present disclosure provides is shown.

The present embodiment provides a digital broadcasting system SYS 2, which includes a transmitting end circuit TX2 and a plurality of receiving end circuits RX21 to RX2N. The transmitting end circuit TX2 is configured to receive a plurality of audio signals and convert the plurality of audio signals into a plurality of coded signals for transmission.

The plurality of receiving end circuits RX21 to RX2N are connected to the transmitting end circuit TX correspondingly through a first connection wire L1 and a second connection wire L2.

In addition, a plurality of audio amplifier circuits AAC1 to AACN are provided. The plurality of audio amplifier circuits AAC1 to AACN are respectively connected to the plurality of receiving end circuits RX21 to RX2N.

The transmitting end circuit TX2 is configured to provide the plurality of coded signals correspondingly to the plurality of receiving end circuits RX21 to RX2N and the plurality of audio amplifier circuits AAC1 to AACN for broadcasting.

In the present embodiment, the coded signals are similar to the coded signals disclosed in the first embodiment. The plurality of coded signals includes a direct current signal, a plurality of first direction indication signals, and a plurality of second direction indication signals.

In the present embodiment, main circuit structures of the transmitting end circuit TX2 and the plurality of receiving end circuits RX21 to RX2N are the same as the transmitting end circuit TXC and the receiving end RXC disclosed in the first embodiment. However, the plurality of receiving end circuits RX21 to RX2N can be correspondingly provided with an address identification information. The transmitting end circuit TX2 can be configured to control a volume according to the address identification information of different receiving end circuits RX21 to RX2N. Alternatively, the transmitting end circuit TX2 can be configured to broadcast the audio signals for a predetermined one of the plurality of receiving end circuits RX21 to RX2N, while the rest of the plurality of receiving end circuits RX21 to RX2N are muted.

Third Embodiment

Figure 6:
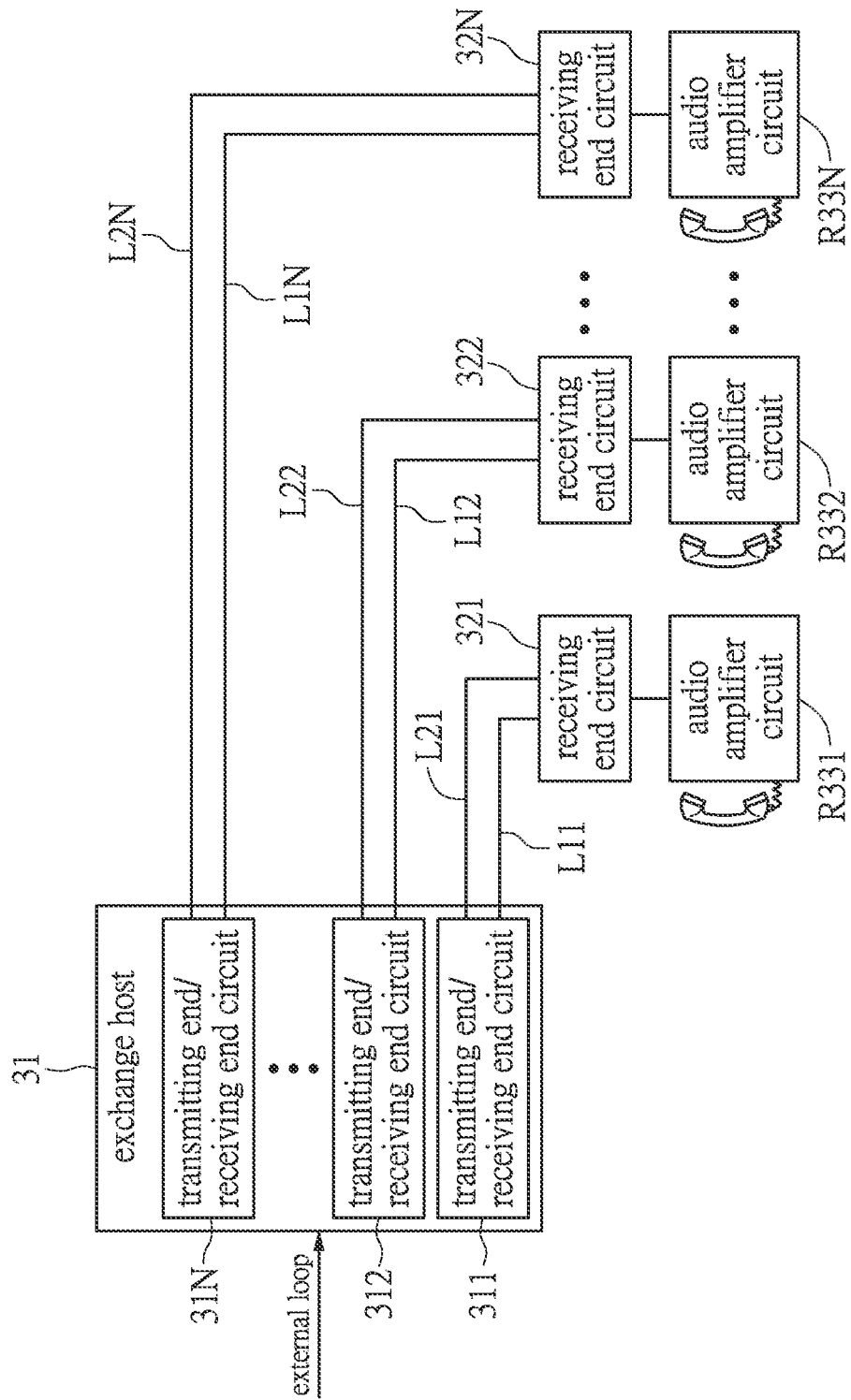
FIG. 6 is a schematic view of a digital telephone exchange system according to a third embodiment of the present disclosure.
Figure 7:
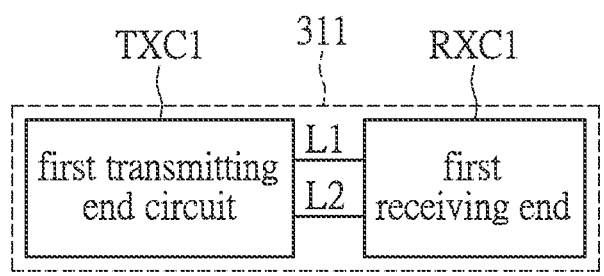
FIG. 7 is a schematic view of a transmitting end/receiving end circuit of an exchange host of FIG. 6.

Reference is made to FIG. 6 and FIG. 7, in which FIG. 6 is a schematic view of a digital telephone exchange system according to a third embodiment of the present disclosure, and FIG. 7 is a schematic view of a transmitting end/receiving end circuit of an exchange host of FIG. 6.

The present embodiment provides a digital telephone exchange system SYS3, which includes an exchange host 31, a plurality of receiving end circuits 321 to 32N, and a plurality of audio amplifier circuits R331 to R33N. The exchange host 31 is configured to receive an audio signal from an external loop.

The exchange host 31 includes a plurality of transmitting end/receiving end circuits 311 to 31N. That is, the transmitting end/receiving end circuit 311 of the exchange host 31 includes the transmitting end circuit TXC, the receiving end circuit RXC, and the first connection wire L1 and the second connection wire L2 interconnecting the transmitting end circuit TXC and the receiving end circuit RXC disclosed in the first embodiment. Each of the first connection wire L1 and the second connection wire L2 can be a circuit board or a copper wire.

Each of the plurality of receiving end circuits 321 to 32N is connected to the exchange host 31 through a corresponding one of first connection wires L11 to L1N and a corresponding one of second connection wires L21 to L2N.

Similarly, the plurality of transmitting end/receiving end circuits 311 to 31N are configured to correspondingly provide a plurality of coded signals to the plurality of receiving end circuits 321 to 32N. The plurality of coded signals are similar to the coded signals disclosed in the first embodiment, i.e., including a direct current signal, a plurality of first direction indication signals, and a plurality of second direction indication signals.

In the present embodiment, each of the plurality of audio amplifier circuits R331 to R33N can be a telephone circuit.

As shown in FIG. 7, each of the plurality of transmitting end/receiving end circuits 311 to 31N includes a first transmitting end circuit TXC1 and a first receiving end circuit RXC1.

The first transmitting end circuit TXC1 is the same as the transmitting end circuit TXC disclosed in the first embodiment, and the first receiving end circuit RXC1 is the same as the receiving end circuit RXC1 disclosed in the first embodiment. The main difference therebetween is that the first connection wire L1 and the second connection wire L2 can be shortened or replaced by a circuit board, a jumper, or other connections. Other circuit configurations will not be reiterated herein.

Beneficial Effects of the Embodiments

In conclusion, in the digital signal coding and decoding method, the digital broadcasting system, and the digital telephone exchange system provided by the present disclosure, a simple coding and decoding method can be utilized to reduce a circuit complexity of a two-wire signal transmission system and a difficulty of a control method, so as to effectively reduce costs for circuits and system configuration.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A digital signal coding and decoding method for coding and decoding a plurality of digital signals, which are reconstructed into the plurality of digital signals, comprising:
providing a direct current signal;
providing a first direction indication signal and a second direction indication signal on the direct current signal according to each digital signal, so as to generate a plurality of coded signals;
wherein the plurality of digital signals include a plurality of low level digital signals and a plurality of high level digital signals;
wherein the first direction indication signal and the second direction indication signal are signals in opposite directions;
receiving the plurality of coded signals;
separating the first direction indication signals, the second direction indication signals, and the direct current signal from the plurality of coded signals; and
performing marking according to the first direction indication signals and the second direction indication signals, and decoding and reconstructing the plurality of coded signals into the plurality of digital signals.

2. A digital broadcasting system; comprising:
a transmitting end circuit;
a plurality of receiving end circuits connected to the transmitting end circuit correspondingly through a first connection wire and a second connection wire; and
a plurality of audio amplifier circuits respectively connected to the plurality of receiving end circuits;
wherein the transmitting end circuit is configured to provide a plurality of coded signals including a direct current signal, a plurality of first direction indication signals, and a plurality of second direction indication signals; wherein the plurality of first direction indication signals and the plurality of second direction indication signals are provided on the direct current signal, and each of the plurality of first direction indication signals and each of the plurality of second direction indication signal are signals in opposite directions.

3. A digital telephone exchange system, comprising:
an exchange host including a plurality of transmitting end/receiving end circuits; and
a plurality of receiving end circuits each connected to the exchange host correspondingly through a first connection wire and a second connection wire;
wherein the plurality of transmitting end/receiving end circuits are configured to respectively provide a plurality of coded signals to the plurality of receiving end circuits; wherein the plurality of coded signals include a direct current signal, a plurality of first direction indication signals, and a plurality of second direction indication signals, the plurality of first direction indication signal and the plurality of second direction indication signals are provided on the direct current signal, and each of the plurality of first direction indication signals and each of the plurality of second direction indication signal are signals in opposite directions.

4. The digital telephone exchange system according to claim 3, wherein each of the plurality of transmitting end/receiving end circuits includes a first transmitting end circuit and a first receiving end circuit, and the first transmitting end circuit is electrically connected to the first receiving end circuit;
wherein the first transmitting end circuit includes:
a direct current power supply circuit configured to provide the direct current signal;
an indication signal generation circuit configured to generate the first direction indication signal and the second direction indication signal; and
a signal coupling circuit correspondingly connected to the direct current power supply circuit and the indication signal generation circuit;
wherein the first receiving circuit includes:
an alternating current/direct current shunt circuit configured to receive the plurality of coded signals and separate the plurality of first direction indication signals, the plurality of second direction indication signals, and the direct current signal;
an indication signal detection and marking circuit connected to the alternating current/direct current shunt circuit and configured to receive the plurality of first direction indication signals and the plurality of second direction indication signals that are separated; and
a direct current voltage conversion circuit connected to the alternating current/direct current shunt circuit and configured to receive the direct current signal that is separated and convert the direct current signal into a second direct current voltage.

* * * * *